US009807803B2

(12) United States Patent
Abraham et al.

(10) Patent No.: US 9,807,803 B2
(45) Date of Patent: Oct. 31, 2017

(54) TRANSMISSION CONTROL FOR WIRELESS COMMUNICATION NETWORKS

(75) Inventors: Santosh P. Abraham, San Diego, CA (US); Sanjiv Nanda, Ramona, CA (US); Saishankar Nandagopalan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 12/720,523

(22) Filed: Mar. 9, 2010

(65) Prior Publication Data

US 2010/0182929 A1 Jul. 22, 2010

Related U.S. Application Data

(62) Division of application No. 11/681,106, filed on Mar. 1, 2007.

(51) Int. Cl.
*H04W 74/08* (2009.01)
*H04L 12/733* (2013.01)
*H04W 84/18* (2009.01)

(52) U.S. Cl.
CPC ......... *H04W 74/0875* (2013.01); *H04L 45/20* (2013.01); *H04W 84/18* (2013.01)

(58) Field of Classification Search
CPC ............. H04L 12/2856; H04L 12/2858; H04L 12/2869; H04L 47/78; H04L 47/782; (Continued)

(56) References Cited

U.S. PATENT DOCUMENTS 5,623,496 A 4/1997 Sagi
5,754,538 A 5/1998 Kumar et al.
(Continued)

FOREIGN PATENT DOCUMENTS

CA 2550394 A1 7/2005
CN 1556597 A 12/2004
(Continued)

OTHER PUBLICATIONS

Zhao et al., Admission Control with Load Balancing in IEEE 802.11-Based ESS Mesh Networks, Aug. 2005, IEEE, pp. 1-8.*
(Continued)

*Primary Examiner* — Edan Orgad
*Assistant Examiner* — Jeremy Costin
(74) *Attorney, Agent, or Firm* — QUALCOMM Incorporated

(57) ABSTRACT

Techniques for controlling transmissions in wireless communication networks are described. In one aspect, transmission control for a mesh network may be achieved by ranking mesh points or stations in the mesh network. In one design, the rank of a first station in the mesh network may be determined. At least one station of lower rank than the first station in the mesh network may be identified. At least one transmission parameter for the at least one station of lower rank may be set by the first station. At least one transmission parameter value may be selected for each station based on the rank, QoS requirements, amount of traffic, and/or achievable data rate for that station and may be sent (e.g., via a probe response message) to the station.

25 Claims, 5 Drawing Sheets

(58) Field of Classification Search
CPC . H04W 72/0406; H04W 72/10; H04W 88/08; H04W 92/045; H04W 45/20; H04W 74/0875
USPC .......... 370/338, 229–230, 254–255; 709/220–226
See application file for complete search history.

(56) References Cited

U.S. PATENT DOCUMENTS

| | | | |
|---|---|---|---|
| 6,678,252 B1 | 1/2004 | Cansever | |
| 7,007,102 B2 | 2/2006 | Billhartz et al. | |
| 7,099,283 B2 | 8/2006 | Matta et al. | |
| 7,525,915 B2 | 4/2009 | Zaki et al. | |
| 7,636,573 B2 | 12/2009 | Walton et al. | |
| 2002/0082035 A1 | 6/2002 | Aihara et al. | |
| 2002/0181428 A1* | 12/2002 | Kruys | 370/338 |
| 2003/0081628 A1 | 5/2003 | Sugar et al. | |
| 2003/0086437 A1 | 5/2003 | Benveniste | |
| 2003/0125067 A1 | 7/2003 | Takeda et al. | |
| 2003/0126246 A1* | 7/2003 | Blouin et al. | 709/223 |
| 2003/0142651 A1 | 7/2003 | Matta et al. | |
| 2003/0169696 A1 | 9/2003 | Quinn et al. | |
| 2003/0179708 A1* | 9/2003 | Kamerman | H04W 48/12 370/241 |
| 2003/0204616 A1 | 10/2003 | Billhartz et al. | |
| 2003/0231715 A1 | 12/2003 | Shoemake et al. | |
| 2004/0029553 A1 | 2/2004 | Cain | |
| 2004/0071154 A1 | 4/2004 | Wentink | |
| 2004/0073659 A1 | 4/2004 | Rajsic et al. | |
| 2004/0170150 A1 | 9/2004 | Guo et al. | |
| 2005/0003827 A1* | 1/2005 | Whelan | H04W 16/10 455/454 |
| 2005/0022203 A1* | 1/2005 | Zisapel et al. | 718/105 |
| 2005/0083838 A1 | 4/2005 | Kandala | |
| 2005/0094585 A1 | 5/2005 | Golden et al. | |
| 2005/0165901 A1 | 7/2005 | Bu et al. | |
| 2005/0190771 A1 | 9/2005 | Tan et al. | |
| 2005/0197148 A1 | 9/2005 | Ali et al. | |
| 2005/0259647 A1 | 11/2005 | Wakumoto et al. | |
| 2005/0270975 A1 | 12/2005 | Meylan et al. | |
| 2006/0019663 A1 | 1/2006 | Cuffaro et al. | |
| 2006/0034235 A1* | 2/2006 | Yamane | 370/338 |
| 2006/0036762 A1* | 2/2006 | Vadlakonda et al. | 709/238 |
| 2006/0039395 A1 | 2/2006 | Perez-Costa et al. | |
| 2006/0040663 A1 | 2/2006 | Ise et al. | |
| 2006/0040705 A1* | 2/2006 | Kawakami et al. | 455/561 |
| 2006/0052088 A1 | 3/2006 | Pavon et al. | |
| 2006/0056382 A1* | 3/2006 | Yamada et al. | 370/349 |
| 2006/0087974 A1 | 4/2006 | Ozer et al. | |
| 2006/0133272 A1 | 6/2006 | Yuan et al. | |
| 2006/0146874 A1 | 7/2006 | Yuan et al. | |
| 2006/0215583 A1* | 9/2006 | Castagnoli | 370/254 |
| 2006/0251119 A1 | 11/2006 | Ramesh | |
| 2007/0074198 A1* | 3/2007 | Gassoway | H04L 67/06 717/168 |
| 2007/0206500 A1* | 9/2007 | Mollah | H04B 7/2606 370/235 |
| 2007/0214379 A1 | 9/2007 | Abraham et al. | |
| 2008/0062878 A1 | 3/2008 | Habetha et al. | |
| 2009/0248829 A1* | 10/2009 | Habetha et al. | 709/208 |

FOREIGN PATENT DOCUMENTS

| | | |
|---|---|---|
| CN | 1581831 A | 2/2005 |
| CN | 1719931 A | 1/2006 |
| CN | 1735016 A | 2/2006 |
| EP | 1032153 A2 | 8/2000 |
| JP | 2000059372 A | 2/2000 |
| JP | 2001237764 A | 8/2001 |
| JP | 2002044003 A | 2/2002 |
| JP | 2003110575 A | 4/2003 |
| JP | 2003258719 A | 9/2003 |
| JP | 2004032668 A | 1/2004 |
| JP | 2004328164 A | 11/2004 |
| JP | 2005065226 A | 3/2005 |
| JP | 2005072861 A | 3/2005 |
| JP | 2005086816 A | 3/2005 |
| JP | 2006060787 A | 3/2006 |
| JP | 2008011571 A | 1/2008 |
| RU | 2158479 C2 | 10/2000 |
| RU | 2163420 C2 | 2/2001 |
| RU | 2243811 | 1/2005 |
| RU | 2261536 | 9/2005 |
| TW | 200520451 | 6/2005 |
| TW | I241812 B | 10/2005 |
| TW | I245523 B | 12/2005 |
| TW | I246010 B | 12/2005 |
| WO | 03073138 | 9/2003 |
| WO | WO-2004064439 A1 | 7/2004 |
| WO | 2005022832 | 3/2005 |
| WO | 2005069878 | 6/2005 |
| WO | WO2005069876 A2 | 8/2005 |
| WO | 2006060239 | 6/2006 |
| WO | 2006099025 | 9/2006 |
| WO | 2006099099 | 9/2006 |

OTHER PUBLICATIONS

Dongmei Zhao et al., "Admission Control with Load Balancing in IEEE 802.11-based ESS Mesh networks," Quaiity of Service in Heterogeneous Wired/Wireless Networks, 2005, IEEE 2nd International Conference on Orlando, Florida.
IEEE Std 802.11e—2005, LAN/MAN Committee of the IEEE Computer Society, Approved Sep. 22, 2005, pp. 48-77.
International Search Report—PCT/US07/063338, International Search Authority, European Patent Office—Nov. 12, 2007.
Written Opinion—PCT/US071063338, International Search Authority, European Patent Office—Nov. 12, 2007.
International Preliminary Report on Patenability—PCT/US07/063338—The International Bureau of WIPO, Geneva, Switzerland—Sep. 9, 2008.
Wing Fai Fan, et al., "Admission Control for Variable Bit Rate Traffic Using Variable Service Interval in IEEE 802.11e WLANs" Computer Communications and Networks, 2004 ICCCN 2004, Proceedings, 13th International Conference on Chicago, IL USA Oct. 11-13, 2004, pp. 447-453.
Analysis of IEEE 802.11e for QoS support in wireless LANs , Stefan Mangold, Wireless Communications, IEEE , Dec. 2003,p. 49.
"ATXOP: an adaptive TXOP based on the data rate to guarantee fairness for IEEE 802.11e wireless LANs", EunKyung Kim, Young-Joo Suh ,Vehicular Technology Conference, 2004. VTC2004-Fall. 2004 IEEE 60th ,Sep. 2004, pp. 2679-2680 .
Dynamic Tuning of the Contention WINWW Minimum ( CWM IN) for Enhanced Service Differentiation in IEEE 802 .II Wireless Ad-Hoc Networks , Gannoune, L. ,Robert, S., Personal, Indoor and Mobile Radio Communications, 2004. PIMRC 2004. 15th IEEE International Symposium on , Sep. 2004 p. 2 .
Taiwan Search Report—TW096107372—TIPO—Jun. 8, 2011.
European Search Report—EP12000919—Search Authority—Munich—Apr. 11, 2012.
European Search Report—EP13020048—Search Authority—Munich—Oct. 21, 2013.
Taiwan Search Report—TW096107372—TIPO—Dec. 22, 2014.
Taiwan Search Report—TW100147611—TIPO—Jul. 9, 2014.
Taiwan Search Report—TW103141258—TIPO—Feb. 18, 2016.

* cited by examiner

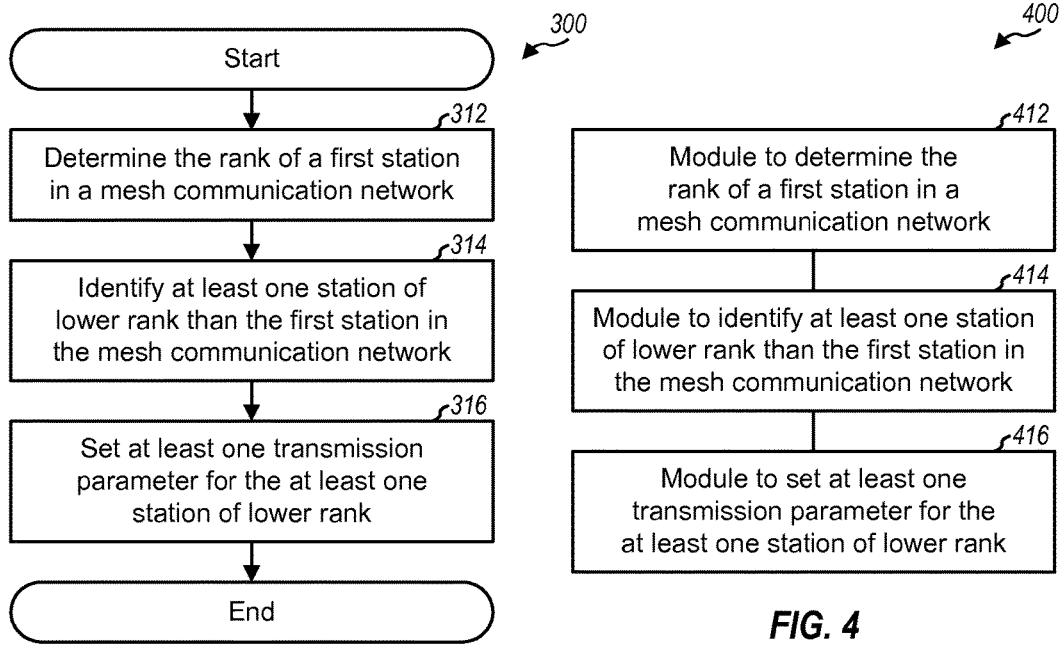
FIG. 3
FIG. 4
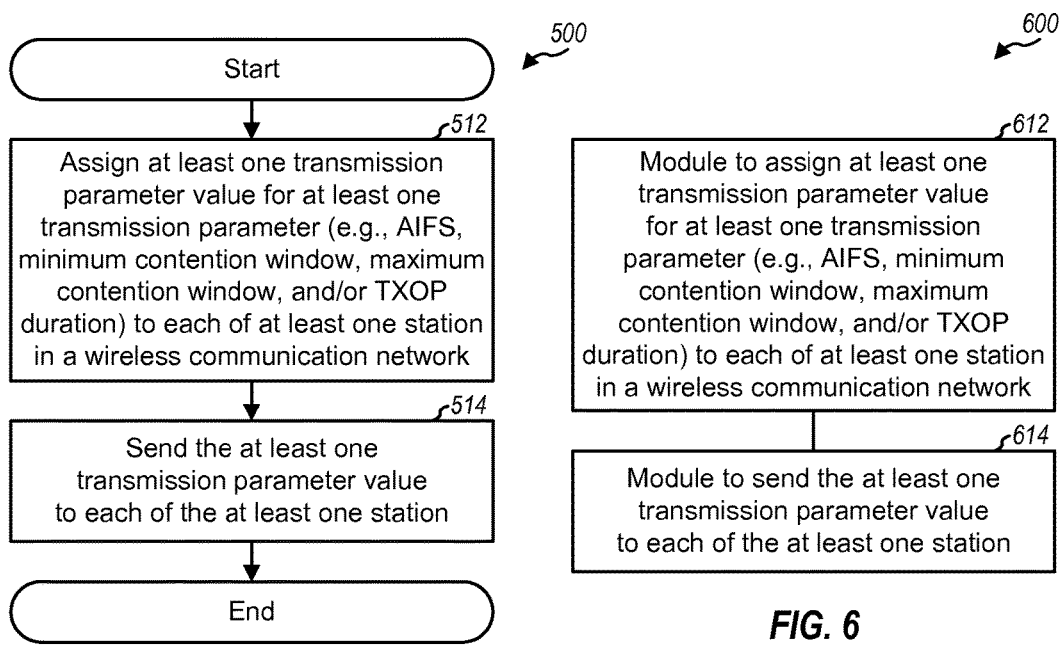
FIG. 5
FIG. 6

TRANSMISSION CONTROL FOR WIRELESS COMMUNICATION NETWORKS

CLAIM OF PRIORITY UNDER 35 U.S.C. §120

The present application for patent is a Divisional and claims priority to patent application Ser. No. 11/681,106 entitled "Transmission Control for Wireless Communication Networks" filed Mar. 1, 2007, and assigned to the assignee hereof and hereby expressly incorporated by reference herein.

BACKGROUND

I. Field

The present disclosure relates generally to communication, and more specifically to techniques for controlling transmissions in wireless communication networks such as mesh networks.

II. Background

A mesh communication network is a network composed of nodes (or mesh points) that can forward traffic for other nodes in the network. The nodes of a mesh network may be any devices capable of communicating with other devices. These devices may be laptop computers, handheld devices, cellular phones, terminals, etc. This flexibility allows a mesh network to be formed and expanded at low cost using existing devices. A mesh network is also robust against node failures. If a given node fails, then traffic may simply find another route and bypass the failed node.

A major challenge in operating a mesh network is controlling transmissions by the nodes such that good performance may be achieved for all or as many nodes as possible. If transmission control is inadequate or ineffective, then the overall performance of the mesh network may be degraded, some or many of the nodes may not achieve their data requirements, and/or other deleterious effects may occur.

There is therefore a need in the art for techniques to effectively control transmissions in a mesh network.

SUMMARY

Techniques for controlling transmissions in wireless communication networks are described herein. In an aspect, transmission control for a mesh network may be achieved by ranking stations (or mesh points or nodes) in the mesh network. In one design, the rank of a first station in the mesh network may be determined. At least one station of lower rank than the first station in the mesh network may be identified. The rank of each station may be determined based on various factors, as described below. At least one transmission parameter for the at least one station of lower rank may be set by the first station. The at least one transmission parameter may comprise (i) an arbitration inter frame space (AIFS) indicative of an idle channel sensing time, (ii) minimum and maximum contention windows used to determine a random backoff before accessing a channel, (iii) transmission opportunity (TXOP) duration, and/or (iv) other parameters.

Various aspects and features of the disclosure are described in further detail below.

BRIEF DESCRIPTION OF THE DRAWINGS

FIGS. 3 and 4 show a process and an apparatus, respectively, for setting transmission parameters in a mesh network.

FIGS. 5 and 6 show a process and an apparatus, respectively, for setting transmission parameters in a wireless network.

DETAILED DESCRIPTION

Figure 1:
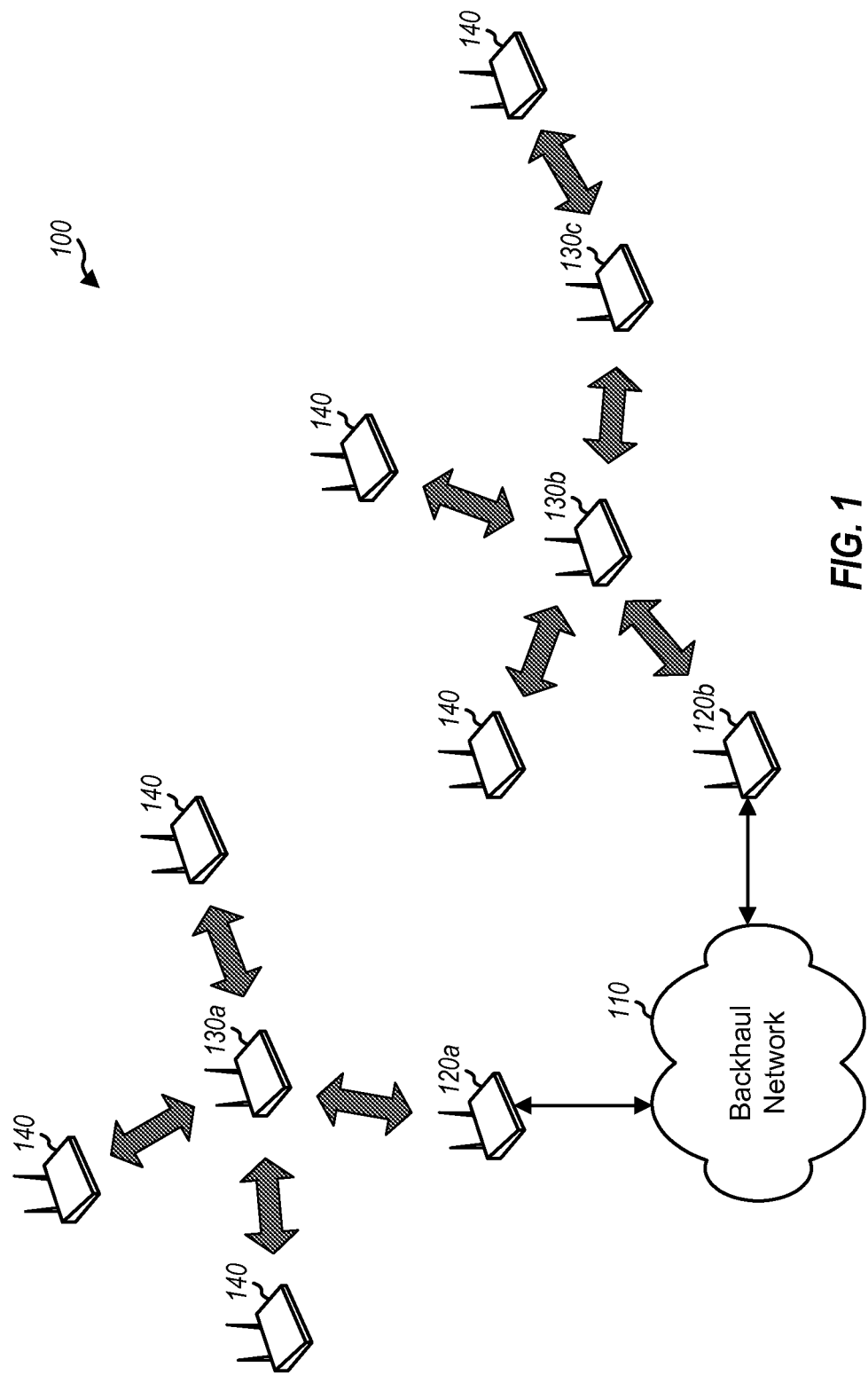
FIG. 1 shows a mesh communication network.

FIG. 1 shows a mesh communication network 100 that includes a number of nodes, which are referred to as mesh points 120, 130 and 140. Mesh points 120 and 130 may forward traffic for other mesh points, while mesh points 140 are leaf mesh points. A leaf mesh point is a mesh point that does not forward traffic for another mesh point. In general, each mesh point may be a station or an access point (AP).

A station is a device that can communicate with another station via a wireless medium. The terms "wireless medium" and "channel" are synonymous and are used interchangeably herein. A station may also be called, and may contain some or all of the functionality of, a terminal, an access terminal, a mobile station, a user equipment (UE), a subscriber unit, etc. A station may be a laptop computer, a cellular phone, a handheld device, a wireless device, a personal digital assistant (PDA), a wireless modem card, a cordless phone, etc.

An AP is a station that can provide access to distribution services via the wireless medium for stations associated with that AP. An AP may also be called, and may contain some or all of the functionality of, a base station, a base transceiver station (BTS), a Node B, an evolved Node B (eNode B), etc. In the example shown in FIG. 1, mesh points 120 and 130 may be APs, and mesh points 140 may be leaf stations and/or APs. APs 120a and 120b may be connected directly to a backhaul network 110, which may be a wired infrastructure acting as the backbone for mesh network 100. Deployment and operating costs may be reduced by having only a subset of the APs connected directly to backhaul network 110. APs 130 may communicate with one another and/or with APs 120 in order to exchange traffic via backhaul network 110. Leaf stations 140 may communicate with APs 120 and/or 130.

In mesh network 100, APs 120 may also be referred to as wired APs, portal APs, mesh portals, etc. APs 130 may also be referred to as unwired APs, mesh APs (MAPs), etc. APs 120 and 130 and leaf stations or APs 140 may also be referred to as mesh points, mesh nodes, nodes, etc. MAPs 130 may act as entities that forward traffic to wired APs 120. A frame of data (or a packet) may flow from a source to a destination via a route that may consist of one or more mesh points. A routing algorithm may be used to determine a sequence of mesh points for the frame to pass through to reach the destination. In certain situations, an AP may be congested and may request other APs that forward traffic to the congested AP to slow down in order to decongest the network.

As illustrated in FIG. 1, a hierarchical structure may be imparted to a mesh network if most of the traffic flows to and from the wired APs. When a given mesh point x first connects to the mesh network, the routing algorithm may be executed to determine a sequence of mesh points that may be used by mesh point x to send frames to the nearest wired AP. Mesh point x may thereafter use this route to send/forward frames to the wired AP.
}

In the following description, the term "station" may refer to a leaf station or an AP. The stations in mesh network 100 may communicate with one another via any radio technology or any combination of radio technologies, such as IEEE 802.11, Hiperlan, Bluetooth, cellular, etc. IEEE 802.11 is a family of standards from The Institute of Electrical and Electronics Engineers (IEEE) for wireless local area networks (WLANs) and is commonly used throughout the world. The stations may also be deployed over any geographic area such as, e.g., a campus, an urban center, a mall, or other hot zone characterized by higher population density and/or greater data usage.

A station may communicate with another station for one or more flows. A flow may be a higher layer data stream (e.g., a TCP or UDP stream) that may be sent via a link between two stations. A flow may carry any type of traffic such as voice, video, packet data, etc. A flow may be for a particular traffic class and may have certain requirements on data rate, latency or delay, etc. A flow may be periodic and sent at regular interval or non-periodic and sent sporadically, e.g., whenever there is data to send. For example, a flow for Voice-over-Internet Protocol (VoIP) may send a data frame every 10 or 20 milliseconds (ms). A station may have one or more flows for one or more traffic types with a given AP.

In an aspect, transmission control for a mesh network may be achieved by ranking the mesh points or stations in the mesh network. The ranking may be based on various factors such as the number of hops to the wired APs, the number of stations associated with the APs, the amount of traffic being forwarded by the APs, the types or classes of traffic being forwarded by the APs, the capabilities of the APs, etc. The AP capabilities may be quantified by achievable data rate, buffer size, and/or other factors. All of the factors used in determining rank may be given appropriate weights and combined to obtain a metric that may be used to ascertain the rank of each mesh point.

In one design, the rank of a given mesh point or station x may be determined based on the number of hops to a wired AP and may be expressed as:

$$\text{Rank}(MP\ x) = \text{MaxRank} - \text{Number of hops to wired AP}, \quad \text{Eq (1)}$$

where Rank (MP x) is the rank of mesh point x, and MaxRank is an arbitrarily chosen maximum value of the rank. Each mesh point in the sequence of one or more mesh points from mesh point x to the wired AP may be considered as one hop. The number of hops to the wired AP may then be equal to the number of mesh points in the sequence of mesh point(s) from mesh point x to the wired AP.

If there are multiple wired APs in the mesh network, then the rank of mesh point x may be determined based on the minimum number of hops to all wired APs and may be expressed as:

$$\text{Rank}(MPx) = \text{MaxRank} - \min_{y \in \{all\ wired\ APs\}} (\text{Number of hops to wired } APy). \quad \text{Eq (2)}$$

A high rank value from equation (1) or (2) corresponds to a higher rank, which typically implies higher required throughput, higher access priorities, etc., as discussed below.

In FIG. 1, wired APs 120a and 120b may have the highest rank of MaxRank, MAPs 130a and 130b may have the next highest rank of MaxRank−1, MAP 130c may have the next highest rank of MaxRank−2, and leaf stations or APs 140 may have ranks of MaxRank−2, MaxRank−3, and MaxRank−4. In general, the hierarchical structure for a mesh network may have any number of layers, and the mesh points may have any number of different ranks. Each mesh point may learn its route as well as the number of mesh points to the nearest wired AP based on the routing algorithm.

A mesh network may utilize any access scheme to allow the mesh points to gain access to the channel. In one design that is described in detailed below, the mesh network utilizes an Enhanced Distributed Channel Access (EDCA) procedure described in IEEE 802.11e, entitled "Amendment: Medium Access Control (MAC) Quality of Service (QoS) Enhancements," which is publicly available. EDCA is relatively simple to implement and supports prioritized access to the channel by the stations based on QoS requirements of the flows carried by these stations and the amount of traffic through the stations.

EDCA utilizes three parameters for controlling transmissions via the channel by the stations. Table 1 lists the three transmission parameters and provides a short description for each parameter. A transmission parameter is a parameter that may control access to the channel and/or transmission on the channel after gaining access. The AIFS and contention windows are channel access parameters and are used to control access to the channel. The TXOP duration regulates transmission once the channel has been accessed.

TABLE 1

| Parameter | Symbol | Description |
| --- | --- | --- |
| Arbitration inter frame space | AIFS | Idle channel sensing time, or amount of time for a channel to be idle before transmission may occur. |
| Minimum and maximum contention windows | $CW_{min}$ & $CW_{max}$ | Used to select a random backoff to wait before transmitting on the channel. |
| Transmission opportunity duration | TXOP Duration | Amount of time a station can transmit on the channel upon gaining access. |

Figure 2:
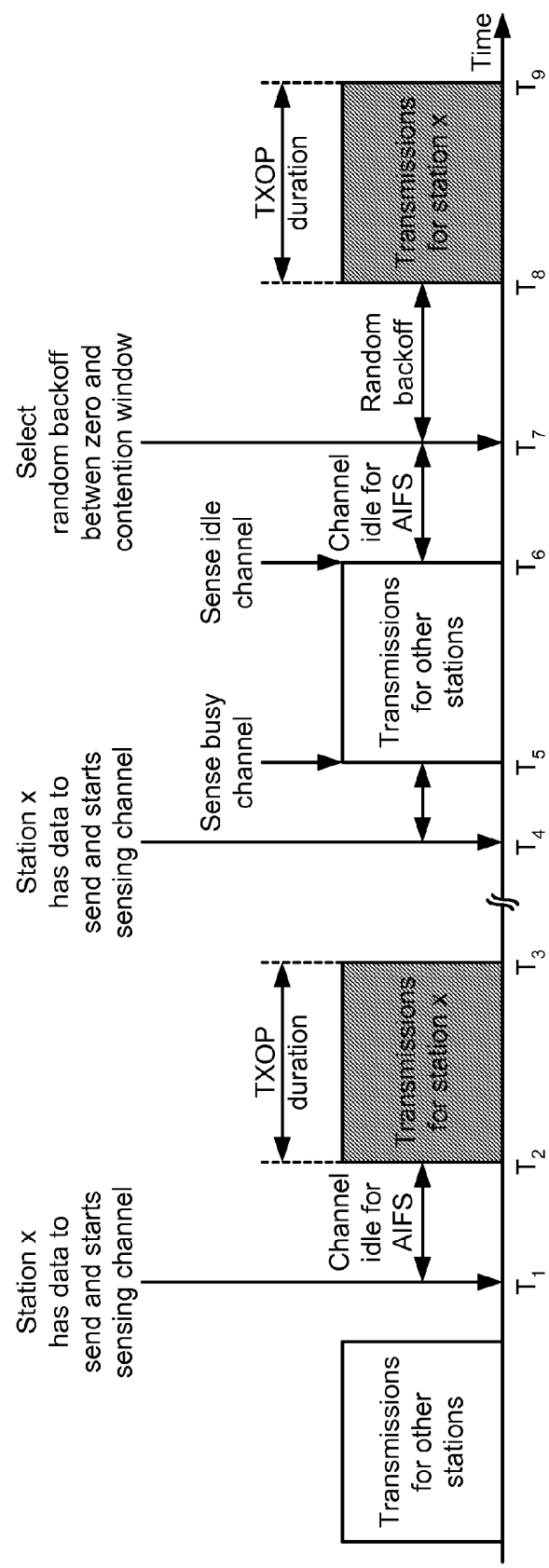
FIG. 2 shows channel access and transmission by a station.

FIG. 2 shows channel access and transmission by a station with EDCA. The station may have data to transmit at time $T_1$ and may sense the channel to determine whether the channel is busy or idle. If the channel is idle for a period of time equal to the AIFS value for that station, then the station may transmit data on the channel starting at time $T_2$, where $T_2-T_1 \geq \text{AIFS}$. The station may be granted a TXOP of a particular duration and may occupy the channel until time $T_3$, which is the end of the TXOP duration.

The station may have more data to transmit at time $T_4$ and may sense the channel to determine whether the channel is busy or idle. In this example, the channel is initially idle but becomes busy at time $T_5$, since there is another station that has an AIFS value that is less than the AIFS value for this station. The station may then wait until the channel becomes idle at time $T_6$ and may further wait for the channel to be idle for a period of time equal to its AIFS value, which occurs at time $T_7$. The station may then select a random backoff between zero and a contention window (CW), which may be set to $CW_{min}$ initially. The random backoff is used to avoid a scenario in which multiple stations transmit simultaneously after sensing the channel idle for AIFS. The station may then count down the random backoff, pausing whenever the channel is busy and restarting the countdown after the channel is idle for AIFS (not shown in FIG. 2). The station may transmit the data when the countdown reaches zero at time $T_8$. The station may be granted a TXOP and may occupy the channel until time $T_9$, which is the end of the TXOP duration. Although not shown in FIG. 2, the station may double the contention window after each unsuccessful transmission until the contention window reaches $CW_{max}$.

The AIFS is the amount of time a station defers access to the channel after a busy period. The AIFS may thus affect the likelihood of gaining access to the channel. In general, a station with higher priority may be assigned a smaller AIFS value and may be able to access the channel before other stations with larger AIFS values. Conversely, a station with lower priority may be assigned a larger AIFS value and may defer access of the channel to other stations with smaller AIFS values.

The minimum contention window and (to a lesser extent) the maximum contention window may determine the average amount of time to access the channel. A station with a smaller $CW_{min}$, may, on average, access the channel in a shorter amount of time than a station with a larger $CW_{min}$.

In another aspect, stations in a wireless network (e.g., a mesh network) may be assigned different transmission parameter values to achieve the data requirements of each station. The data requirements of a given station may be given by a guaranteed rate, QoS requirements, delay requirements, traffic load, etc. Different stations may carry different amounts of traffic and/or have different QoS requirements. Appropriate transmission parameter values may be assigned to each station to achieve the data requirements of that station.

For the mesh network shown in FIG. 1 with few wired APs, a hierarchical architecture may be formed where traffic flows within the mesh network may be dominated by upstream flows towards the wired APs and downstream flows from the wired APs towards the stations. In such a hierarchical mesh network, the following factors may be taken into account in assigning transmission parameter values to individual mesh points or stations.

The rank of a mesh point may be indicative of the amount of traffic being exchanged via the mesh point. A mesh point of higher rank, such as MAP 130*b* in FIG. 1, may carry more traffic than a mesh point of lower rank, such as MAP 130*c*. Furthermore, the traffic through a mesh point of higher rank may have already incurred delays through mesh points of lower ranks. Therefore, a mesh point of higher rank should have higher priority in accessing the channel via smaller AIFS and $CW_{min}$ values.

The amount of traffic and the QoS requirements of the traffic may be considered in assigning transmission parameter values. Each mesh point that forwards QoS traffic may have a descriptor of each flow being sent through that mesh point. The descriptor for each flow may provide rate information (e.g., the average bit rate and the peak bit rate of the flow) and/or delay information. The delay requirements may be used to determine the desired number of accesses per second, which in turn may be used to determine the transmission parameters, e.g., the contention window size. The TXOP duration assigned to a mesh point may be dependent on the amount of traffic carried by the mesh point.

The location of a mesh point may determine the maximum data rate achievable by the mesh point. A lower rank mesh point that is located farther from its higher rank mesh point may have a lower data rate connection to the higher rank mesh point. To ensure fairness for the forwarded flows, the TXOPs assigned to this lower rank mesh point may take into account the data rate achievable by the mesh point so that these flows may be appropriately served.

Other factors may also be considered in assigning transmission parameter values to individual mesh points. For example, the reverse direction TXOP grants of a higher rank mesh point may determine its traffic carrying capability, which may be considered in assigning transmission parameter values to lower rank mesh points. The transmission parameter values may be modified as flows and mesh points are added or removed.

In one design, a higher rank mesh point sets the transmission parameters for a lower rank mesh point. In another design, a pair of mesh points may negotiate between themselves as to which mesh point will set the transmission parameters. In yet another design, a group of mesh points may choose one mesh point to set the transmission parameters for all mesh points in that group or for a particular class of flows. In general, a mesh point that sets the transmission parameters for one or more other mesh points may be selected based on any factor or factors, which may nor may not include rank. In one design that is described below, a mesh point of rank i sets the transmission parameters of mesh points of rank i−1 that communicate with this mesh point of rank i.

In IEEE 802.11e, an AP that supports QoS is referred to as a QoS AP (QAP), and a station that supports QoS is referred to as a QoS STA (QSTA). In IEEE 802.11e, a QAP sets the EDCA parameters for all QSTAs for each access category (or priority) in order to ensure fairness among all of the QSTAs associated with that QAP. This scheme ensures fairness but fails to address the QoS requirements of individual flows. In a mesh network, a mesh point of rank i may have several child nodes of rank i−1. The traffic carried by each of these child nodes may be different. In one design, a higher rank mesh point may assign different transmission parameter values to each of its child nodes. This design may allow the QoS requirements of individual child nodes to be met.

A higher rank mesh point may exchange messages with lower rank mesh points to negotiate and/or communicate transmission parameter values assigned by the higher rank mesh point to the individual lower rank mesh points. In one design, the messages may be carried in probe request and probe response frames, which may be similar to those used in IEEE 802.11e. However, the probe response frames may be extended to contain the transmission parameter values assigned to specific mesh points, which may then set their transmission parameters to the values assigned by the higher rank mesh point. Other signaling messages or management action frames may also be defined to transport these transmission parameter values.

The transmission parameters may be set in various manners. For clarity, several specific designs of setting the transmission parameters are described below. These designs assume that priority is determined by rank, so that a higher ranking mesh point has higher priority. The rank of a mesh point may be determined by the number of hops to the wired AP, as shown in equations (1) and (2), and/or based on other factors.

In one design, the transmission parameters may be set for each traffic categories having different QoS requirements. The traffic categories may also be referred to as traffic classes, access categories, access classes, etc. In IEEE 802.11e, up to eight traffic categories may be supported and may be assigned different priorities. For clarity, the setting of transmission parameters for one traffic category is described below. The same process may be repeated for each supported traffic category.

In one design, mesh points are assigned AIFS values determined based on their ranks. A mesh point with a larger AIFS value may be "starved" by mesh points with smaller AIFS values. Hence, mesh points of higher ranks should have smaller AIFS values compared to mesh points of lower ranks, especially since higher rank mesh points may have more traffic and should thus have higher likelihood of accessing the channel. The mesh portals (e.g., wired APs 120a and 120b in FIG. 1) should have the smallest possible AIFS value. In one design, the AIFS values for mesh points may be given as:

$$AIFS[i-1] = AIFS[i] + \delta, \quad \text{Eq (3)}$$

where AIFS [i] is the AIFS value for a mesh point of rank i, and

δ is an incremental AIFS value that is greater than zero.

In general, the AIFS values for the mesh points may be selected such that AIFS[i−1]≥AIFS[i], where AIFS[i−1] may be defined based on any function of AIFS[i]. For example, AIFS[i−1] may be given as AIFS[i−1]=η·AIFS [i], where η is a scaling factor that is equal to or greater than one. Other functions may also be used to obtain AIFS [i−1] from AIFS [i].

In one design, the same minimum and maximum contention window values are used for all mesh points, and the TXOP durations are assigned based on the data requirements of the mesh points. This design may allow some mesh points to have higher throughput than others. However, this design may introduce longer delays if a given mesh point is assigned a large TXOP and other mesh points need to wait till the end of the TXOP in order to access the channel.

In another design, the minimum and maximum contention window values as well as the TXOP duration are assigned to each mesh point based on the data requirements of that mesh point. A minimum contention window may be selected for a given mesh point as follows. It can be shown that over a sufficiently long period of time, the ratio of the number of successful attempts $n_i$ and $n_j$ of two mesh points i and j, respectively, may be approximately related as follows:

$$\frac{n_i}{n_j} = \frac{CW_{min}^j}{CW_{min}^i}, \quad \text{Eq (4)}$$

where $CW_{min}^i$ and $CW_{min}^j$ are the minimum contention window values for mesh points i and j, respectively. Equation (4) suggests that the ratio of the number of successful accesses, and therefore the delay to obtaining access of the channel, is roughly proportional to the minimum contention window value. Here, the maximum contention window has not been considered.

A set of higher and lower bounds or thresholds for the minimum contention window may be defined as follows:

1. $CW_{min}^{LT}$—a lower bound on the minimum contention window, which may be determined based on the maximum tolerable number of collisions for transmission, and
2. $CW_{min}^{HT}$—a higher bound on the minimum contention window, which may be determined based on the highest delay tolerance of a flow.

The minimum contention window of a flow may be set using equation (4) and may be constrained to be within the lower bound $CW_{min}^{LT}$ and the higher bound $CW_{min}^{HT}$. A flow with the highest delay tolerance may have its minimum contention window set to $CW_{min}^{HT}$. A flow with a smaller delay tolerance may have its minimum contention window set lower than $CW_{min}^{HT}$.

In one design, the TXOP duration is assigned to meet the traffic load carried by each mesh point. The average delay for channel access by a given mesh point, as given by the contention process, may be denoted as D. This average channel access delay may be dependent on the AIFS value and the minimum and maximum contention window values assigned to the mesh point. A TXOP limit, which is the largest TXOP that may be assigned to the mesh point, may be set as a function of number of frames that arrives during the time between consecutive channel accesses based on a traffic specification (TSPEC) for the mesh point. This TXOP limit may be given as:

$$TXOP_{limit} = \frac{D \cdot g}{L}, \quad \text{Eq (5)}$$

where g is a guaranteed rate for an application, and
L is a frame size for the application.

The guaranteed rate g may be derived from TSPEC parameters if they are known or may be derived based on the peak and mean rate requirements of the application. Using token bucket parameters, the guaranteed rate g may be expressed as:

$$g = \frac{P}{\left[1 + d \cdot \frac{P-\rho}{\sigma}\right] \cdot (1-p_e)}, \quad \text{Eq (6)}$$

where d represents delay bound, P represents peak rate, ρ represents mean rate, σ represents burst size, and $p_e$ represents error rate. These parameters may be given in the TSPEC.

The mesh point may have a cumulative flow that is composed of individual flows having potentially different frame sizes and/or different guaranteed rates. In this case, the frame sizes of the individual flows may be weighted based on the contributions of these flows to obtain an average frame size L for the cumulative flow. The average frame size L may be determined as follows:

$$L = \frac{\sum_k g_k \cdot L_k}{\sum_k g_k}, \quad \text{Eq (7)}$$

where $g_k$ is a guaranteed rate for flow k and $L_k$ is a frame size for flow k.

The TXOP duration may thus be assigned to the mesh point based on the amount of traffic and the QoS requirements of the mesh point. The TXOP limit may be determined, e.g., as shown in equations (5) through (7). The TXOP duration may be equal to the TXOP limit to ensure that the guaranteed rate g can be achieved with the average channel access delay D and the frame size L. The TXOP duration may be shorter than the TXOP limit when the traffic load is lighter and/or has a data rate that is lower than the guaranteed rate g.

A higher rank mesh point may change the TXOP limits of lower rank mesh points, e.g., depending on the number of TXOPs granted to the lower rank mesh points through grants in the reverse direction.

In one design, the assigned transmission parameter values may be sent via probe request and probe response messages. In other designs, the assigned transmission parameter values may be sent via other signaling messages (e.g., access parameter update signaling messages or other management action frames), or as part of data frames, or via other mechanism.

In yet another aspect, an AP may broadcast its current load information in its beacon frames to allow neighboring APs to determine the channel occupancy time by this AP. The AP may also make channel measurements in idle periods when the AP is not sending or receiving traffic and may estimate the channel occupancy time by neighboring APs based on the channel measurements. The AP may filter the channel measurements to obtain a more accurate estimate of the channel occupancy time by the neighboring APs.

FIG. 3 shows a design of a process 300 for setting transmission parameters in a mesh communication network. The rank of a first station in the mesh communication network may be determined (block 312). At least one station of lower rank than the first station in the mesh communication network may be identified (block 314). At least one transmission parameter for the at least one station of lower rank may be set by the first station (block 316).

The rank of each station may be determined based on the number of hops from that station to a designated station (e.g., a wired AP) in the mesh network. The rank of each station may also be determined based on other factors, as noted above. The at least one station may communicate directly with the first station and may be one rank lower than the first station.

The at least one transmission parameter may comprise an AIFS, a minimum contention window, a maximum contention window, a TXOP duration, or any combination thereof. The first station may assign at least one transmission parameter value to each station based on data requirements of that station and/or other factors, e.g., based on the rank of the station, the QoS requirements of the station, the amount of traffic carried by the station, the data rate achievable by the station, reverse direction grants of the first station, etc. The first station may send the at least one transmission parameter value to each station via a probe response message or some other mechanism. The first station may assign the same or different transmission parameter values to the at least one station.

The first station may autonomously set the at least one transmission parameter for the at least one station. Alternatively, the first station may negotiate with each station to set the at least one transmission parameter for that station. The first station may also be selected by the at least station to set the at least one transmission parameter for the at least one station.

FIG. 4 shows a design of an apparatus 400 for setting transmission parameters in a mesh communication network. Apparatus 400 includes means for determining the rank of a first station in the mesh communication network (module 412), means for identifying at least one station of lower rank than the first station in the mesh communication network (module 414), and means for setting at least one transmission parameter for the at least one station of lower rank (module 416). Modules 412 to 416 may comprise processors, electronics devices, hardware devices, electronics components, logical circuits, memories, etc., or any combination thereof.

FIG. 5 shows a design of a process 500 for setting transmission parameters in a wireless communication network, which may or may not be a mesh network. At least one transmission parameter value for at least one transmission parameter may be assigned to each of at least one station in the wireless communication network (block 512). The at least one transmission parameter value for each station may be selected based on the rank of the station, the QoS requirements of the station, the amount of traffic carried by the station, the data rate achievable by the station, the reverse direction grants to the at least one station, etc. The at least one transmission parameter value assigned to each station may be sent to that station, e.g., via probe response frames, access parameter update signaling messages, or other management action frames, or as part of data frames, or via some other mechanism (block 514).

The at least one transmission parameter may comprise an AIFS indicative of an idle channel sensing time. The station that is assigning the at least one transmission parameter value may be associated with a first AIFS value. At least one AIFS value that is larger than the first AIFS value may be assigned to the at least one station to give the at least one station lower probability of accessing the channel than the assigning station.

The at least one transmission parameter may comprise a minimum contention window and/or a maximum contention window used to determine a random backoff before accessing the channel. A minimum contention window value may be selected for each station based on guaranteed rate and/or delay requirements of at least one flow sent by that station. The minimum contention window value may be constrained to be within a lower bound and a higher bound determined for the station. The lower bound may be determined based on the maximum tolerable number of collisions for transmissions sent by the station. The higher bound may be determined based on the maximum delay requirements of the at least one flow sent by the station. A minimum contention window value may be selected for each flow based on the higher bound, the delay requirements of that flow, and the maximum delay requirements for all of the at least one flow. A maximum contention window value may also be selected for each station.

The at least one transmission parameter may comprise TXOP duration. The TXOP duration for each station may be selected based on average channel access delay, delay requirements, guaranteed rate, achievable data rate, average frame size, etc., for the station. The average frame size for a station with multiple flows may be determined based on a weighted average of the frame sizes for the multiple flows, e.g., as shown in equation (7).

FIG. 6 shows a design of an apparatus 600 for setting transmission parameters in a wireless communication network. Apparatus 600 includes means for assigning at least one transmission parameter value for at least one transmission parameter (e.g., AIFS, minimum contention window, maximum contention window, TXOP duration, etc.) to each of at least one station in the wireless communication network (module 612), and means for sending the at least one transmission parameter value to each of the at least one station (module 614). Modules 612 and 614 may comprise processors, electronics devices, hardware devices, electronics components, logical circuits, memories, etc., or any combination thereof.

Figure 7:
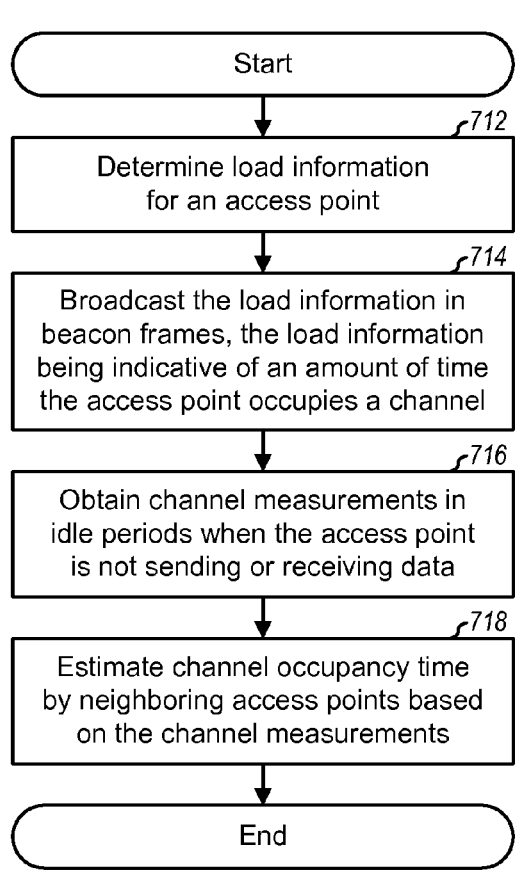
FIGS. 7 and 8 show a process and an apparatus, respectively, for determining channel occupancy time.

FIG. 7 shows a design of a process 700 for determining channel occupancy time. Load information for an access point may be determined (block 712) and broadcast in beacon frames (block 714). The load information may be indicative of an amount of time the access point occupies the channel. Channel measurements may also be obtained in idle periods when the access point is not sending or receiving data (block 716). Channel occupancy time by neighboring access points may be estimated based on the channel measurements (block 718). The channel measurements may be filtered to obtain a more accurate estimate of the channel occupancy time by the neighboring access points.

Figure 8:
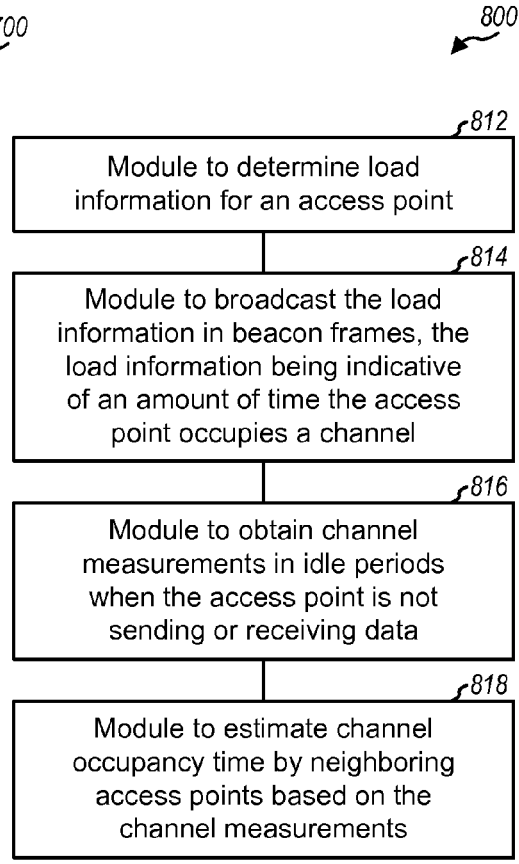

FIG. 8 shows a design of an apparatus 800 for determining channel occupancy time. Apparatus 800 includes means for determining load information for an access point (module 812), means for broadcasting the load information in beacon frames, with the load information being indicative of an amount of time the access point occupies the channel (module 814), means for obtaining channel measurements in idle periods when the access point is not sending or receiving data (module 816), and means for estimating channel occupancy time by neighboring access points based on the channel measurements (module 818). Modules 812 to 818 may comprise processors, electronics devices, hardware devices, electronics components, logical circuits, memories, etc., or any combination thereof.

Figure 9:
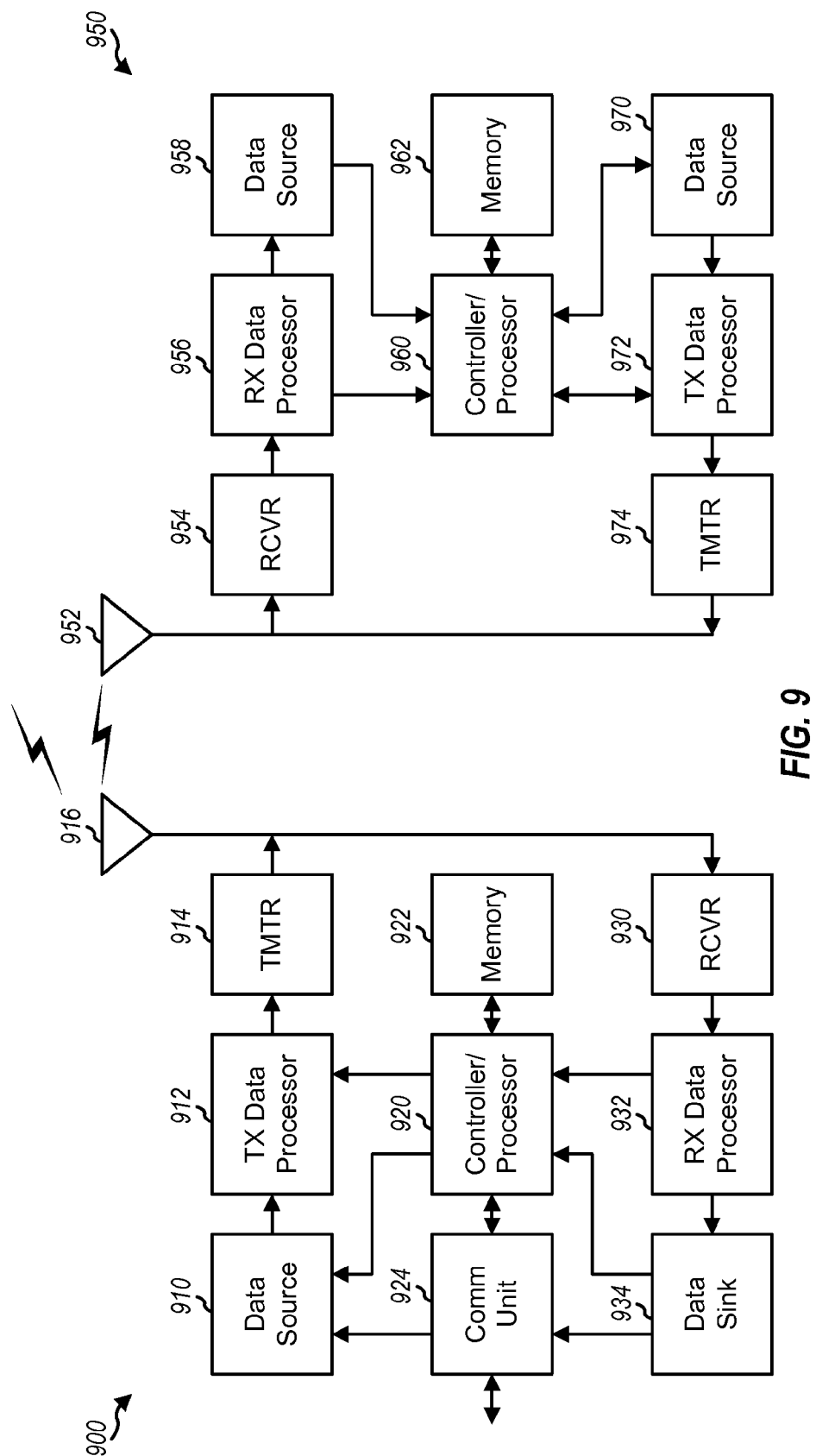
FIG. 9 shows a block diagram of two stations in a wireless network.

FIG. 9 shows a block diagram of two stations 900 and 950 in a wireless communication network, e.g., a mesh network. Station 900 may be a wired AP 120, and station 950 may be a MAP 130 in mesh network 100 in FIG. 1. Station 900 may also be a MAP 130, and station 950 may be a leaf station 140 in mesh network 100.

At station 900, a transmit (TX) data processor 912 receives traffic data from a data source 910, control data (e.g., transmission parameter values) from a controller/processor 920, and scheduling information from a scheduler 924. TX data processor 912 processes (e.g., encodes, interleaves, modulates, and scrambles) the data for each recipient station based on a rate selected for that station, processes control data and scheduling information, and generates output chips. A transmitter (TMTR) 914 processes (e.g., converts to analog, amplifies, filters, and upconverts) the output chips and generates a modulated signal, which is transmitted via an antenna 916 to the recipient stations.

At station 950, an antenna 952 receives the modulated signal from station 900 and provides a received signal. A receiver (RCVR) 954 processes the received signal and provides samples. A receive (RX) data processor 956 processes (e.g., descrambles, demodulates, deinterleaves, and decodes) the samples, provides decoded data for station 950 to a data sink 958, and provides control data and scheduling information to a controller/processor 960. A TX data processor 972 receives traffic data from a data source 970 and control data from controller/processor 960. TX data processor 972 processes the traffic data and control data based on a rate selected for station 950 and generates output chips. A transmitter 974 processes the output chips and generates a modulated signal, which is transmitted via antenna 952.

At station 900, antenna 916 receives the modulated signals from station 950 and possibly other stations. A receiver 930 processes a received signal from antenna 916 and provides samples. An RX data processor 932 processes the samples and provides decoded data for each transmitting station to a data sink 934 and provides control data to controller/processor 920.

Controllers/processors 920 and 960 direct the operation at stations 900 and 950, respectively. Controllers/processors 920 and/or 960 may also implement process 300 in FIG. 3, process 500 in FIG. 5, process 700 in FIG. 7, and/or other processes for transmission control. Memories 922 and 962 store data and instructions for stations 900 and 950, respectively. If station 900 is a wired AP, then a communication (Comm) unit 924 may support communication between station 900 and a backhaul network.

The techniques described herein may be implemented by various means. For example, these techniques may be implemented in hardware, firmware, software, or a combination thereof. For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with instructions (e.g., procedures, functions, etc.) that perform the functions described herein. The firmware and/or software instructions may be stored in a memory (e.g., memory 922 or 962 in FIG. 9) and executed by a processor (e.g., processor 920 or 960). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
at least one processor of a wired access point configured to determine a rank of a first wireless access point in a mesh communication network, wherein the wired access point uses at least one factor to obtain a metric to ascertain the rank of the first wireless access point, and wherein the rank of the first wireless access point is determined based, at least in part, on a number of hops from the first wireless access point to a designated access point in the mesh communication network, to identify at least one wireless access point of lower rank than the first wireless access point in the mesh communication network, and to set at least one transmission parameter for the at least one wireless access point of lower rank; and
a memory coupled to the at least one processor.

2. The apparatus of claim 1, wherein the at least one transmission parameter comprises at least one of an arbitration inter frame space (AIFS), a minimum contention window, a maximum contention window, and a transmission opportunity (TXOP) duration.

3. The apparatus of claim 1, wherein the at least one processor is configured to assign at least one transmission parameter value to each of the at least one wireless access point of lower rank based on data requirements of the at least one wireless access point of lower rank.

4. The apparatus of claim 1, wherein the at least one processor is configured to assign at least one transmission parameter value to each of the at least one wireless access point of lower rank, and to send the at least one transmission parameter value to each of the at least one wireless access point of lower rank via a probe response message.

5. The apparatus of claim 1, wherein the at least one processor is configured to autonomously set the at least one transmission parameter for the at least one wireless access point of lower rank.

6. The apparatus of claim 1, wherein the at least one processor is configured to negotiate with each of the at least one wireless access point of lower rank to set the at least one transmission parameter for the at least one wireless access point of lower rank.

7. The apparatus of claim 1, wherein the first wireless access point is selected by the at least one wireless access point of lower rank to set the at least one transmission parameter for the at least one wireless access point of lower rank.

8. The apparatus of claim 1, wherein the at least one wireless access point of lower rank communicates directly with the first wireless access point and is one rank lower than the first wireless access point.

9. An apparatus comprising:
at least one processor of a wired access point configured to determine a rank of a first wireless access point in a mesh communication network, wherein the wired access point uses at least one factor to obtain a metric to ascertain the rank of the first wireless access point, and wherein the rank of the first wireless access point is determined based, at least in part, on a number of hops from the first wireless access point to a designated access point in the mesh communication network, to identify at least one wireless access point of higher rank than the first wireless access point in the mesh communication network, to select one of the at least one wireless access point of higher rank to set at least one transmission parameter for the first wireless access point, and to receive at least one transmission parameter value from the selected wireless access point of higher rank; and
a memory coupled to the at least one processor.

10. The apparatus of claim 9, wherein the at least one processor is configured to perform channel access based on the at least one transmission parameter value.

11. A method comprising:
determining, by a wired access point, a rank of a first wireless access point in a mesh communication network, wherein the wired access point uses at least one factor to obtain a metric to ascertain the rank of the first wireless access point, and wherein the rank of the first wireless access point is determined based, at least in part, on a number of hops from the first wireless access point to a designated access point in the mesh communication network;
identifying, by the wired access point, at least one wireless access point of lower rank than the first wireless access point in the mesh communication network; and
setting, by the wired access point, at least one transmission parameter for the at least one wireless access point of lower rank.

12. The method of claim 11, wherein the setting the at least one transmission parameter comprises
assigning at least one transmission parameter value to each of the at least one wireless access point of lower rank based on data requirements of the at least one wireless access point of lower rank.

13. The method of claim 11, wherein the at least one transmission parameter comprises at least one of an arbitration inter frame space (AIFS), a minimum contention window, a maximum contention window, and a transmission opportunity (TXOP) duration.

14. The method of claim 11, further comprising:
assigning at least one transmission parameter value to each of the at least one wireless access point of lower rank; and
sending the at least one transmission parameter value to each of the at least one wireless access point of lower rank via a probe response message.

15. The method of claim 11, further comprising:
negotiating with each of the at least one wireless access point of lower rank to set the at least one transmission parameter for the at least one wireless access point of lower rank.

16. An apparatus comprising:
means for determining, by a wired access point, a rank of a first wireless access point in a mesh communication network, wherein the wired access point uses at least one factor to obtain a metric to ascertain the rank of the first wireless access point, and wherein the rank of the first wireless access point is determined based, at least in part, on a number of hops from the first wireless access point to a designated access point in the mesh communication network;
means for identifying, by the wired access point, at least one wireless access point of lower rank than the first wireless access point in the mesh communication network; and
means for setting, by the wired access point, at least one transmission parameter for the at least one wireless access point of lower rank.

17. The apparatus of claim 16, wherein the means for setting the at least one transmission parameter comprises
means for assigning at least one transmission parameter value to each of the at least one wireless access point of lower rank based on data requirements of the at least one wireless access point of lower rank.

18. The apparatus of claim 16, wherein the at least one transmission parameter comprises at least one of an arbitration inter frame space (AIFS), a minimum contention window, a maximum contention window, and a transmission opportunity (TXOP) duration.

19. The apparatus of claim 16, further comprising:
means for assigning at least one transmission parameter value to each of the at least one wireless access point of lower rank; and
means for sending the at least one transmission parameter value to each of the at least one wireless access point of lower rank via a probe response message.

20. The apparatus of claim 16, further comprising:
means for negotiating with each of the at least one wireless access point of lower rank to set the at least one transmission parameter for the at least one wireless access point of lower rank.

21. A non-transitory processor-readable medium including instructions stored thereon that, when executed by a processor of a wired access point, cause the wired access point to perform operations comprising:
determine a rank of a first wireless access point in a mesh communication network, wherein the wired access point uses at least one factor to obtain a metric to ascertain the rank of the first wireless access point, and wherein the rank of the first wireless access point is determined based, at least in part, on a number of hops from the first wireless access point to a designated access point in the mesh communication network;
identify at least one wireless access point of lower rank than the first wireless access point in the mesh communication network; and set at least one transmission parameter for the at least one wireless access point of lower rank.

22. The non-transitory processor-readable medium of claim 21, the operations further comprising:
assign at least one transmission parameter value to each of the at least one wireless access point of lower rank based on data requirements of the at least one wireless access point of lower rank.

23. The non-transitory processor-readable medium of claim 21, the operations further comprising:
assign at least one transmission parameter value to each of the at least one wireless access point of lower rank, and to send the at least one transmission parameter value to each of the at least one wireless access point of lower rank via a probe response message.

24. The non-transitory processor-readable medium of claim 21, the operations further comprising:
negotiate with each of the at least one wireless access point of lower rank to set the at least one transmission parameter for the at least one wireless access point of lower rank.

25. An apparatus, comprising:
a processor, in a wired access point, configured to determine a rank of a first wireless access point in a mesh communication network, wherein the rank of the first wireless access point is determined by subtracting a minimum number of hops between the first wireless access point and a designated access point from a maximum rank in the mesh communication network, and wherein the designated access point comprises a wired access point closest to the first wireless access point, configured to identify a second wireless access point in the mesh communication network having a lower rank than the first wireless access point, and configured to set at least one transmission parameter for the second wireless access point; and
a memory coupled to the processor.

* * * * *